(12) United States Patent
Remy

(10) Patent No.: US 7,108,308 B2
(45) Date of Patent: Sep. 19, 2006

(54) SAFETY MIRROR SUPPORT FOR SUN VISORS

(75) Inventor: Dominique Remy, Rupt sur Moselle (FR)

(73) Assignee: Grupo Antolin-Ingenieria, S.A., Burgos (ES)

( * ) Notice: Subject to any disclaimer, the term of this patent is extended or adjusted under 35 U.S.C. 154(b) by 0 days.

(21) Appl. No.: 11/298,691

(22) Filed: Dec. 12, 2005

(65) Prior Publication Data
US 2006/0131917 A1 Jun. 22, 2006

(30) Foreign Application Priority Data
Dec. 13, 2004 (EP) .................................. 04381044

(51) Int. Cl.
*B60R 13/02* (2006.01)
(52) U.S. Cl. .................................. 296/97.5; 296/187.05
(58) Field of Classification Search ................ 296/97.5, 296/187.05
See application file for complete search history.

(56) References Cited

U.S. PATENT DOCUMENTS 6,679,544 B1 * 1/2004 Hubbert et al. ......... 296/187.05
6,796,593 B1 * 9/2004 Hennessey ................. 296/97.1

* cited by examiner

*Primary Examiner*—Joseph D. Pape
(74) *Attorney, Agent, or Firm*—Birch, Stewart, Kolasch & Birch, LLP

(57) ABSTRACT

A safety mirror support comprises a housing which presents the edges of the mirror area with an abutment to prevent the contact of the occupant's head to the mirror. In case contact occurs, elastic elements are placed behind the mirror for absorbing the energy of the impact and then releasing that energy once the impact force has disappeared. The elastic elements could include a spring made from metal of from plastic material. There is also a back plate placed between the elastic elements and the mirror, for reinforcing the mirror and for spreading the impact forces across the surface of the mirror.

17 Claims, 6 Drawing Sheets

A-A

A-A

SAFETY MIRROR SUPPORT FOR SUN VISORS

OBJECT OF THE INVENTION

The present invention relates to a safety mirror support for sun visors from among the sun visors used in the interior of motor vehicles.

Characterizes the present invention its special design and cooperation of the different pieces which configures the sun visor, obtaining a sun visor which offers a special resistance against mirror breakage and subsequent projection of any of the pieces or part of them, used in the construction of the sun visor; assuming as a main goal of this invention to fulfil head impact test requirements without mirror breakage.

The target of this invention is to get a solution valid for head impact test without mirror breakage after testing.

So the present invention is limited to sun visors and in a special way among those designed against breakage of the mirror.

BACKGROUND OF THE INVENTION

Sun visors are placed in vehicle interiors and thus subjected to impact exigencies when a collision occurs. Then these parts are also designed to fulfil the requirements for occupant's safety.

According to specification EC21 mirrors must not break under a specific impact force, which involves its time and magnitude.

For this purpose, some different inventions are known in the state of the art. Some of them try to prevent contact between head's occupant and mirror and others try to withstand strength received from the impact force.

It is known in the state of the art that there are different solutions adopted in order to obtain sun visors, which either avoid the breakage of the mirror or, in case this occurs, avoid the contact of broken pieces against the user.

An example is German Patent Number DE2742318 which discloses a sun visor fixed to the flat face of a padded sun blind with a transparent film, which covers the mirror and is fastened down at the edges. The mirror may be recessed to lie flush with the flush of the sun blind. The plastic film is preferably thermoplastic, fixed by welding. It is mentioned that this sun visor provides greater safety in an accident.

European Patent Number EP0401759 discloses a safety mirror which comprises a glass mirror with an adhesive layer or tape on its reflective surface side, and an integral transparent cover having an essentially rectangular shape, and made as one piece from a plastic material for housing the glass mirror.

PCT application number WO03053740 relates a breakage-prevention support structure for safety mirrors which are mounted to an element inside a motor vehicle. The inventive structure comprises an internal base body, the external, rear side of which is covered. Moreover, said body comprises a housing for a mirror. A glass mirror, a rigid sheet and an absorbent layer are combined in order to enable the element to withstand impact.

German Patent Number DE 20214231U describes a sun visor where the cosmetic mirror is placed in such a way that in case of impact the user's head does not contact to the mirror.

So the aim of the present invention is to design a sun visor support provided with elastic means which absorbs the impact energy in case of head contacts to mirror and allows the mirror to be again in its original position.

Although the previous mentioned solutions disclose different designs for a sun visor in order to prevent any damage to the user, none of the cited solutions provides a sun visor support, which is designed to prevent breakage of the sun visor and protect the user, and elastic means. Elastic means prevent the damage of sun visor pieces in most of impact cases, so is possible to reuse the sun visor. This means that it is possible to reuse the sun visor in case none of its parts are broken without need of replacing any sun visor component.

DESCRIPTION OF THE INVENTION

The present invention basically consists in a mirror placed in such a manner that prevents contact between it and the user's head. However, it might occur that impact force is so large that contact exists, hence sun visor is provided with means for absorbing impact strength, allowing recovery of the mirror to its initial position once the impact force has disappeared. Means to absorb impact strength consist in elastic ones, acting also as a base support for mirror which is reinforced by a back plate that also spread impact forces all over its surface. In case of impact this elastic means are compressed and recover its original position when the strength is dissipated.

To guarantee the stability of the mirror, the elastic mean has two or more elastic beams. As a result, force can hit on every place on mirror, not being necessarily centred or aligned to any mirror axis.

Besides, sun visor housing where the elastic means and the mirror are placed presents its edges high enough to prevent any contact when occupant's head hits on sun visor.

Due to the design of the mirror support for sun visors of the present invention some advantages are obtained. Firstly, in case of impact neither the mirror nor the rest of the housing are broken into pieces which could damage the user. Secondly, as the mirror is provided with elastic means for absorbing the impact, that one remains undamaged, being possible its further use due to the elastic means push mirror back to its initial position, and thirdly, the elastic means offer the possibility of an easy assembly because of its size and shape provide a simple fitting-up.

DESCRIPTION OF THE DRAWINGS

To supplement the description that will be carried out below and with the aim of leading to a better understanding of its characteristics, this descriptive report is accompanied by a set of drawings, in a illustrative and non limiting way, showing the most significant details of the invention represented.

DESCRIPTION OF THE PREFERRED EMBODIMENTS

In the light of the figures some embodiments of the invention are described bellow.

Figure 1:
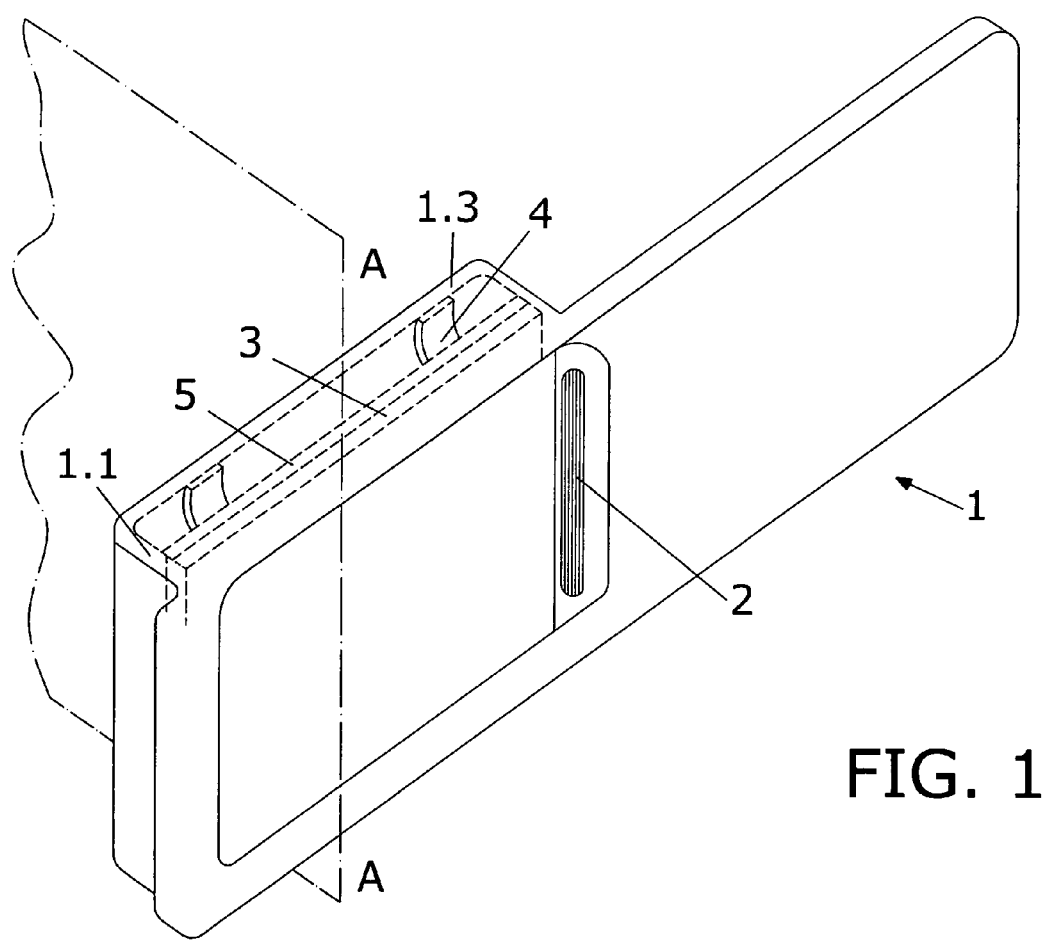
FIG. 1 shows an assembly mirror with a sliding cover among the mirrors fitted on sun visors.

In FIG. 1, we observe a mirror assembly (1) with a sliding cover (2) as an example; however any other implementation of the mirror cover can be carried out without modification of the aim of the invention.

The mirror assembly (1) comprises, in this example, a housing (1.1) with a closing wall (1.3) at the rear side where is placed a mirror (3), elastic means (4) and a reinforcement back plate (5).

Figure 2:
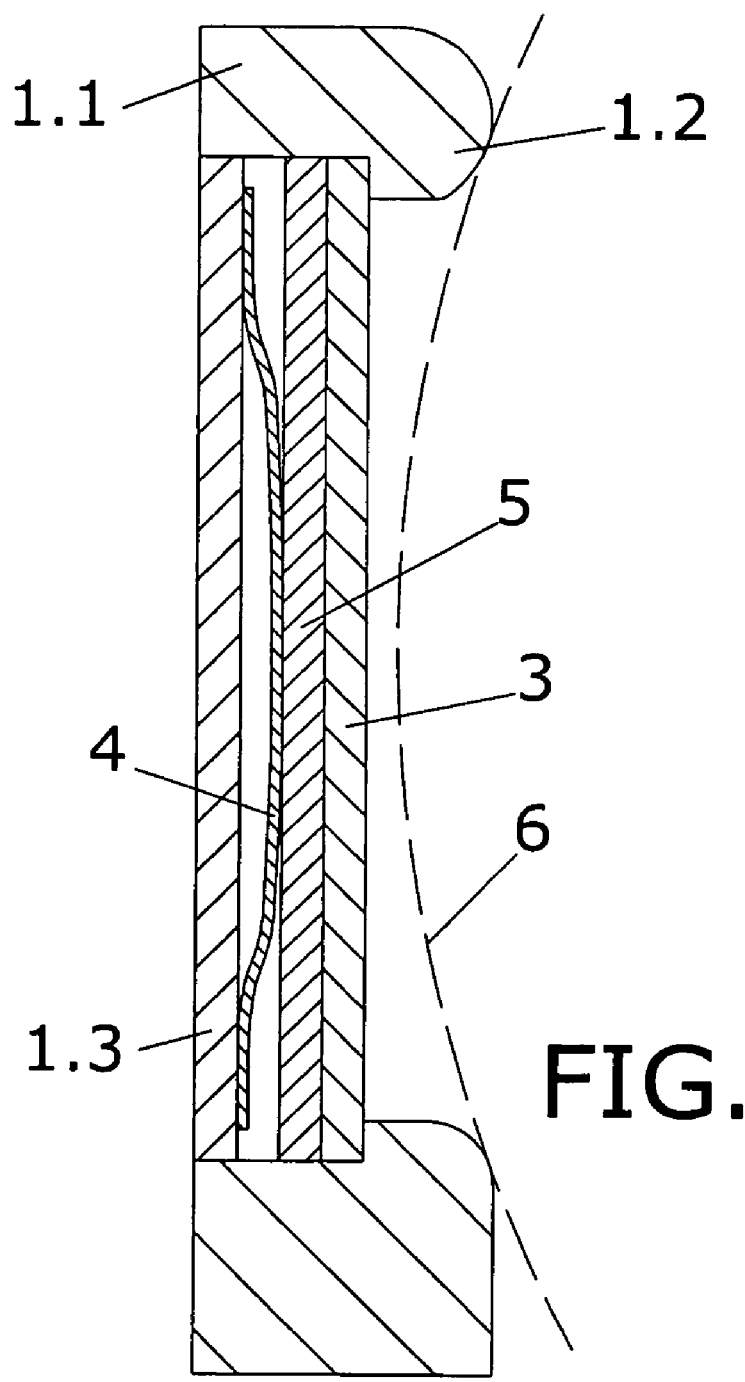
FIG. 2, shows the section A—A of FIG. 1.

In FIG. 2, section A—A is shown, where it is possible to observe the distribution of the different elements inside the housing (1.1).

Housing (1.1) has abutments (1.2) that, when impact occurs, occupant's head do not contact to mirror (3). In this FIG. 2, occupant's head profile has been represented by a curved dashed line (6) at the moment of beginning to contact to the sun visor.

Describing from the view side to the interior, the elements placed inside the housing (1.1), in this example, are:
  a mirror (3),
  a back plate (5), to reinforce the mirror (3) and avoid projection of mirror splinters, (it is made of metal or plastic material),
  elastic means (4), which absorb the impact energy in case of occupant's head contacts to the mirror (3) surface and recovers its original position when force disappears.
  closing wall (1.3) which closes the rear side of the housing (1.1).

Figure 3:
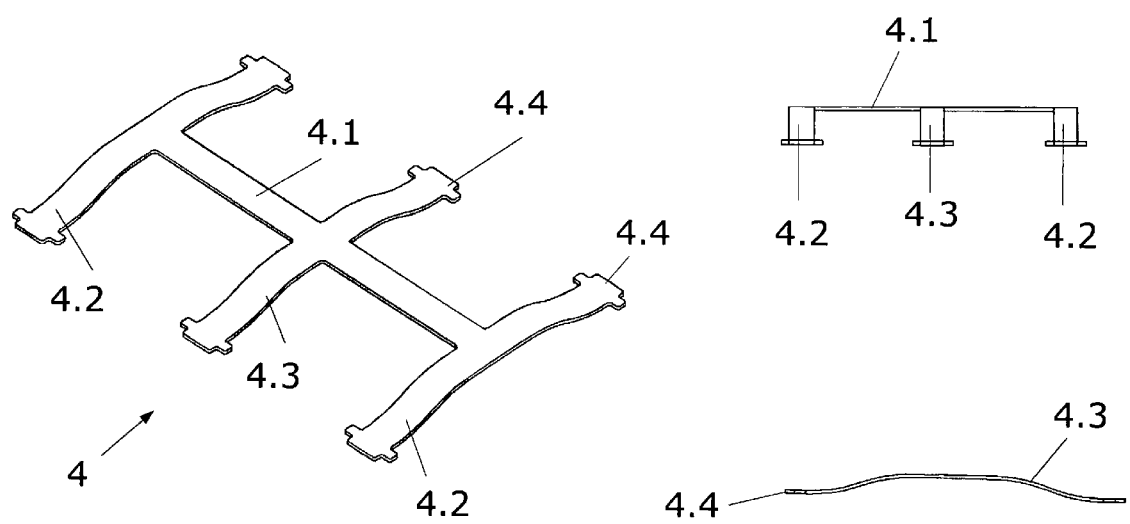
FIG. 3, shows an embodiment of the elastic means in a perspective view and its front and side view.

In FIG. 3 it is shown an embodiment of the elastic means (4). The elastic means (4) in this case, consists in a central beam (4.1) from which emerge two lateral (4.2) and one middle elastic (4.3) beams.

Front view and side view in FIG. 3 shows that the central beam (4.1) is flat and the profile of lateral and middle beams (4.2, 4.3) are curved. So the ends (4.4) of these curved beams (4.2, 4.3) are the ones that rest or are fixed in different elements of the sun visor, as it is possible to see in the different figures that accompanies the present report. The ends (4.4) of these elastic beams (4.2, 4.3) are the support of the elastic means (4).

Although in FIG. 3 there is only one middle elastic beam (4.3) it is possible to have either no one or more than one middle elastic beam (4.3). The number of middle elastic beams (4.3) depends on the size of the mirror (3). The additional middle elastic beams (4.3) can be equidistributed along the central beam (4.1)

The central beam (4.1) works as a connecting element between lateral (4.2) and middle elastic beams (4.3).

Another embodiments of the elastic means (4) could show more than one central beam (4.1) acting also as connecting elements.

The elastic means (4) are made of metal or plastic or any suitable material that are able to absorb the energy in case of an impact on the mirror (3) with no permanent plastic deformation.

Figure 4:
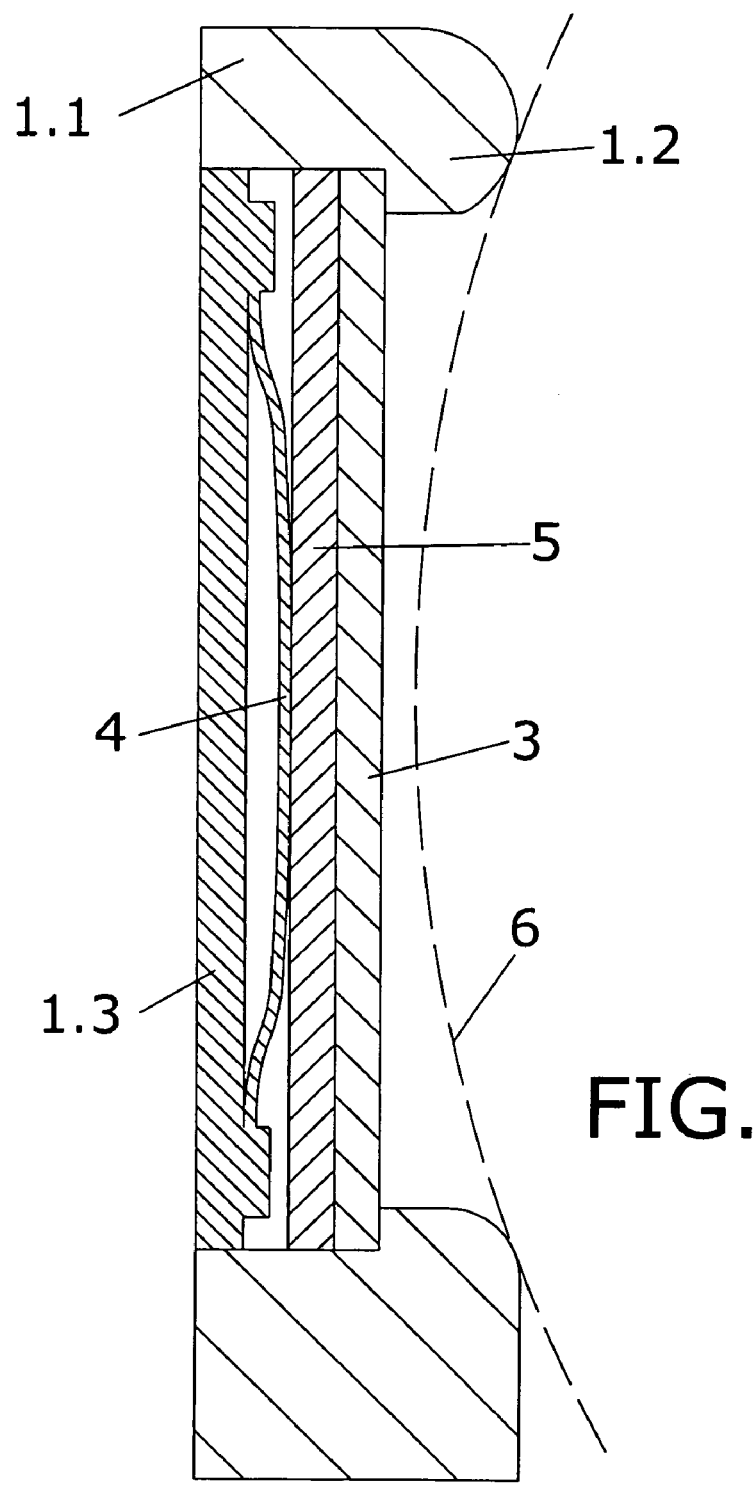
FIG. 4, shows the elastic means integrated in the closing wall.

FIG. 4, shows the elastic means (4) integrated in the closing wall (1.3) of the housing (1.1). In case occupant's head contact to the mirror (3), mirror (3) and back plate (5) moves together and pushes the central beam (4.1), what makes the elastic beams (4.2, 4.3) being compressed against the closing wall (1.3) to recover their original shape once the force has disappeared.

It is also possible that elastic means have its central beam (4.1) pushing onto the closing wall (1.3) and the ends of the elastic (4.2, 4.3) beams resting on the back plate (5).

Figure 5:
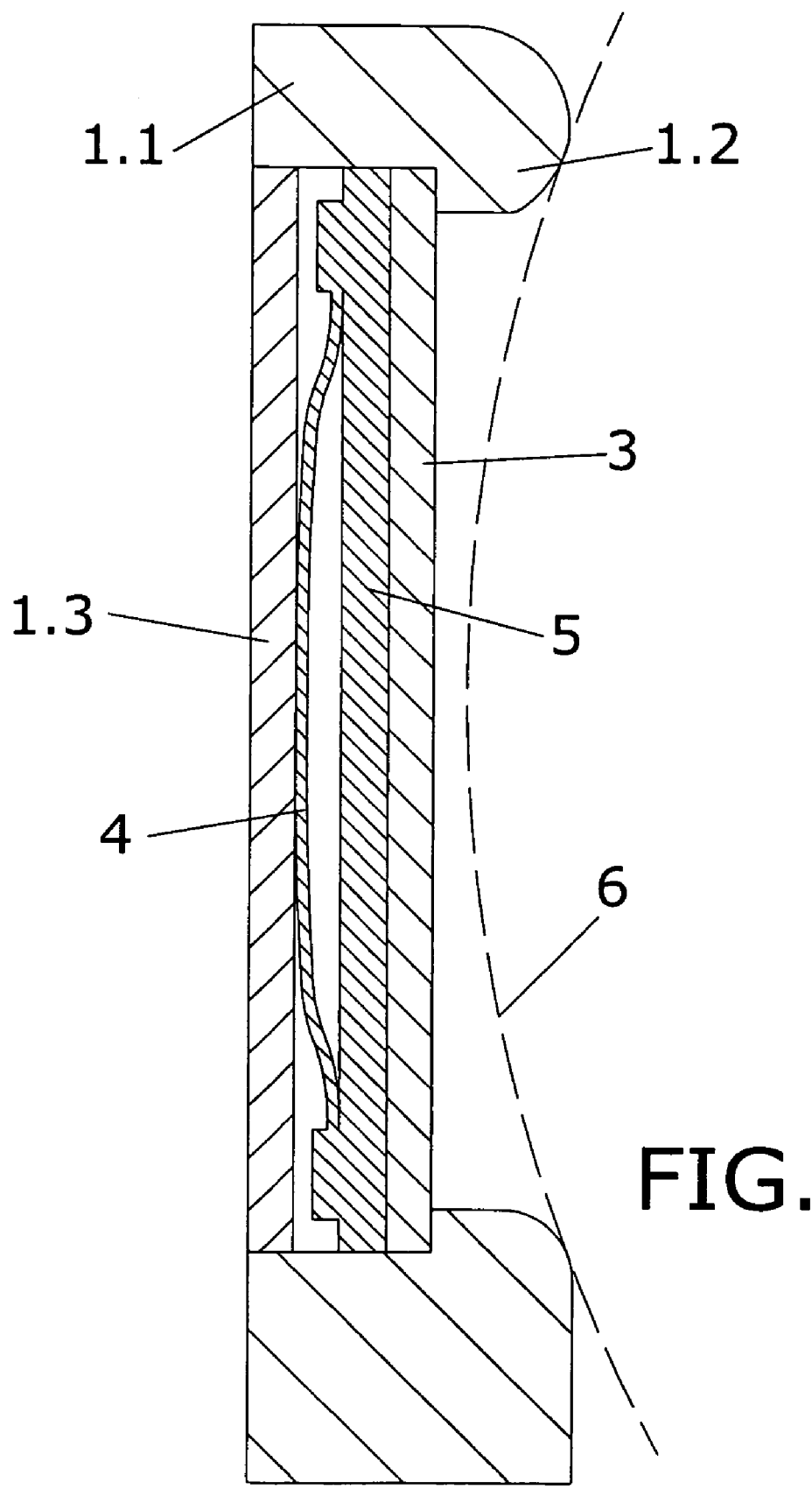
FIG. 5, shows the elastic means integrated in the back plate.

FIG. 5, shows the elastic means (4) integrated in the back plate (5). In this case if occupant's head contact to the mirror (3) then, mirror (3), back plate (5) and spring or elastic means (4) moves together pushing the central beam (4.1) against the closing wall (1.3).

So, it is possible that central beam (4.1) pushes against back plate (5) or closing wall (1.3). In both cases the ends (4.4) of the elastic beams (4.2, 4.3) can either rest or be integrated in the responsive elements. Also the invention can be carried out without closing wall (1.3) in all the examples said before not affecting to the way of working of the invent described. In this last embodiment, closing wall (3) is replaced by the sun visor body.

Figure 6:
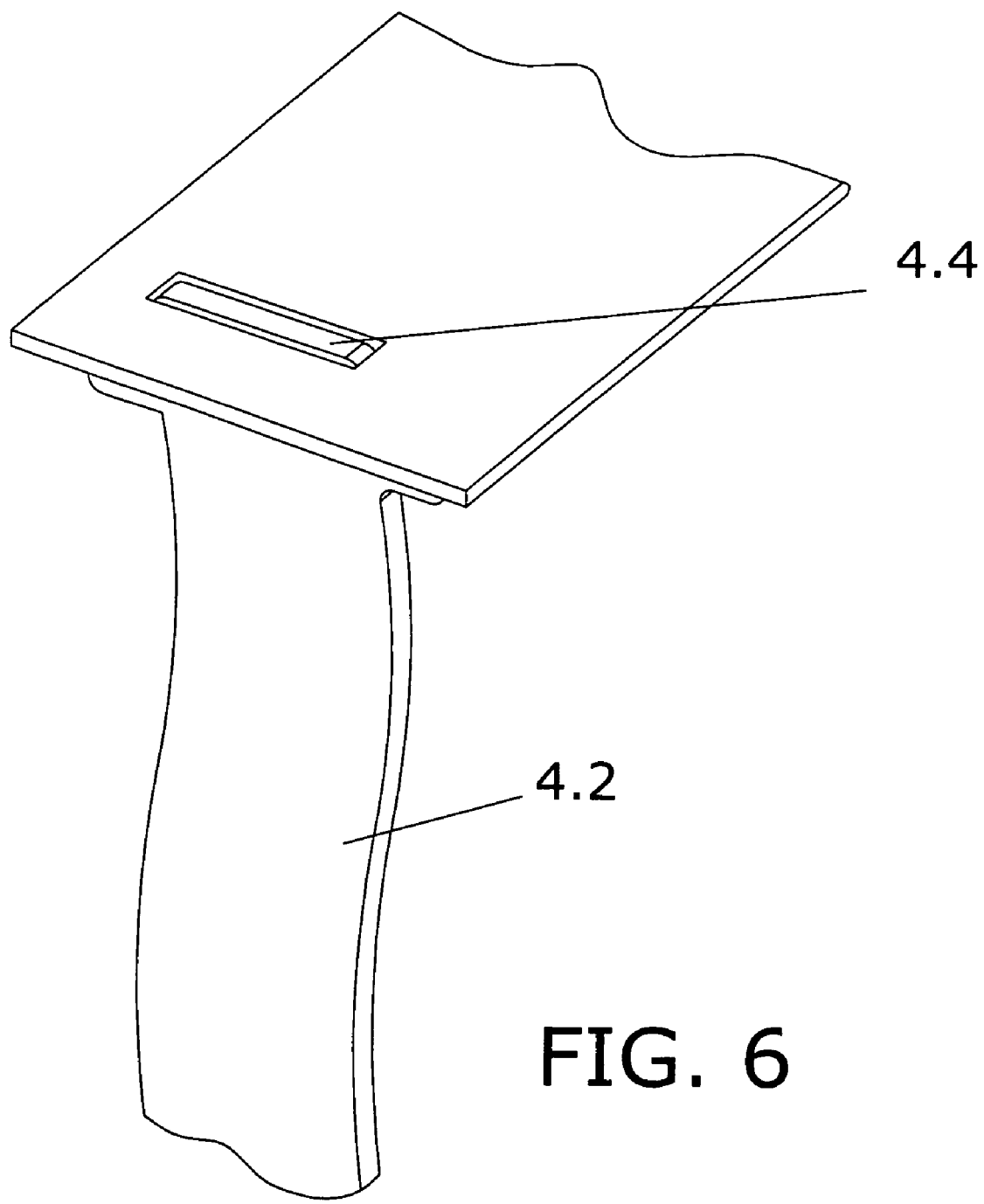
FIG. 6, shows the elastic means fixed by clipping.

FIG. 6 shows that the elastic means are fixed to the sun visor by clipping the ends (4.4) of the elastic beams (4.2, 4.3) to the support where is fixed to.

There is also the possibility where the ends (4.4) of the elastic beams (4.2, 4.3) are integrated in their supports, being just one piece instead of two separated elements.

Variations in materials, shapes, size and layout of the component parts, described in non-limiting way, do no alter the essential nature of this invention, this being sufficient for its reproduction by an expert.

The invention claimed is:

1. A safety mirror support for a sun visor to prevent breakage of the mirror in case of impact comprising a mirror reinforced by a back plate pressed by elastic means, wherein the elastic means includes at least a central beam from which emerge at least two lateral elastic beams, wherein the elastic means absorbs the energy of an impact and recovers its original shape once the force applied has disappeared.

2. A safety mirror support for a sun visor according to claim 1, wherein the elastic means has at least one middle elastic beam.

3. A safety mirror support for a sun visor according to claim 2, wherein the at least one middle elastic beam comprises two beams which are equidistributed along the central beam.

4. A safety mirror support for a sun visor according to claim 1, wherein the lateral elastic beams have a curved profile.

5. A safety mirror support for a sun visor according to claim 1, wherein the elastic means includes at least a middle elastic beam having a curved profile.

6. A safety mirror support for a sun visor according to claim 1, wherein the elastic means are made of metal.

7. A safety mirror support for a sun visor according to claim 1, wherein the elastic means are made of plastic material.

8. A safety mirror support for a sun visor according to claim 1, wherein the central beam pushes on the back plate and the elastic beams rest on a closing wall.

9. A safety mirror support for a sun visor according to claim 8, wherein the elastic means are integrated with the closing wall.

10. A safety mirror support for a sun visor according to claim 1, wherein the central beam pushes on the closing wall and the elastic beams rest on the back plate.

11. A safety mirror support for a sun visor according to claim 10, wherein the elastic means are integrated in the back plate.

12. A safety mirror support for a sun visor according to claim 1, further including a housing and a closing wall which are integrated in one piece.

13. A safety mirror support for a sun visor according to claim 12, wherein the housing, closing wall and elastic means are integrated in one piece.

14. A safety mirror support for a sun visor according to claim 1, wherein the back plate is made of metal.

15. A safety mirror support for a sun visor according to claim 1, wherein the back plate is made of plastic materials.

16. A safety mirror support for a sun visor according to claim 1, wherein the central beam pushes on the back plate and the elastic beams rest on the sun visor body.

17. A safety mirror support for a sun visor according to claim 1, wherein the elastic means are fixed by clipping.

\* \* \* \* \*